July 1, 1969   KAZUTO TOGINO   3,453,051
OPTICAL SCALE-LINE DETECTING SYSTEM
Filed Feb. 12, 1964
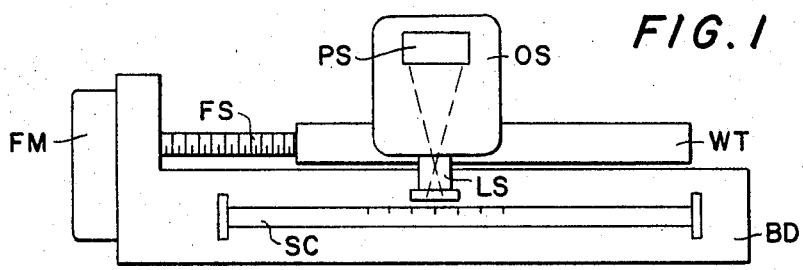
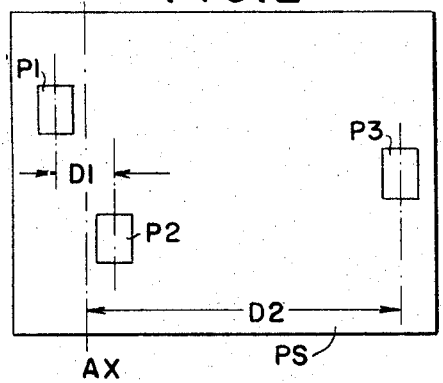
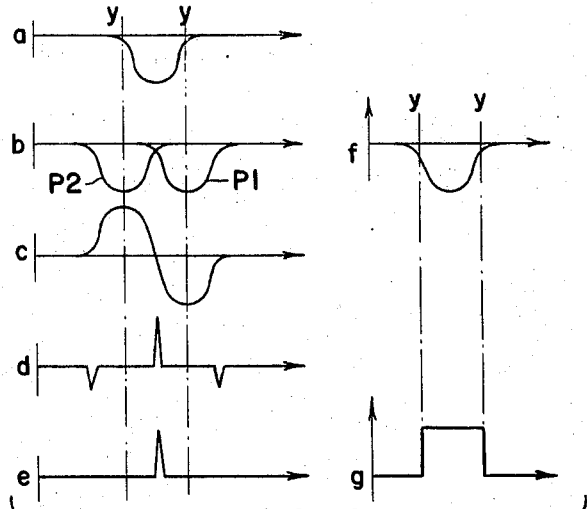
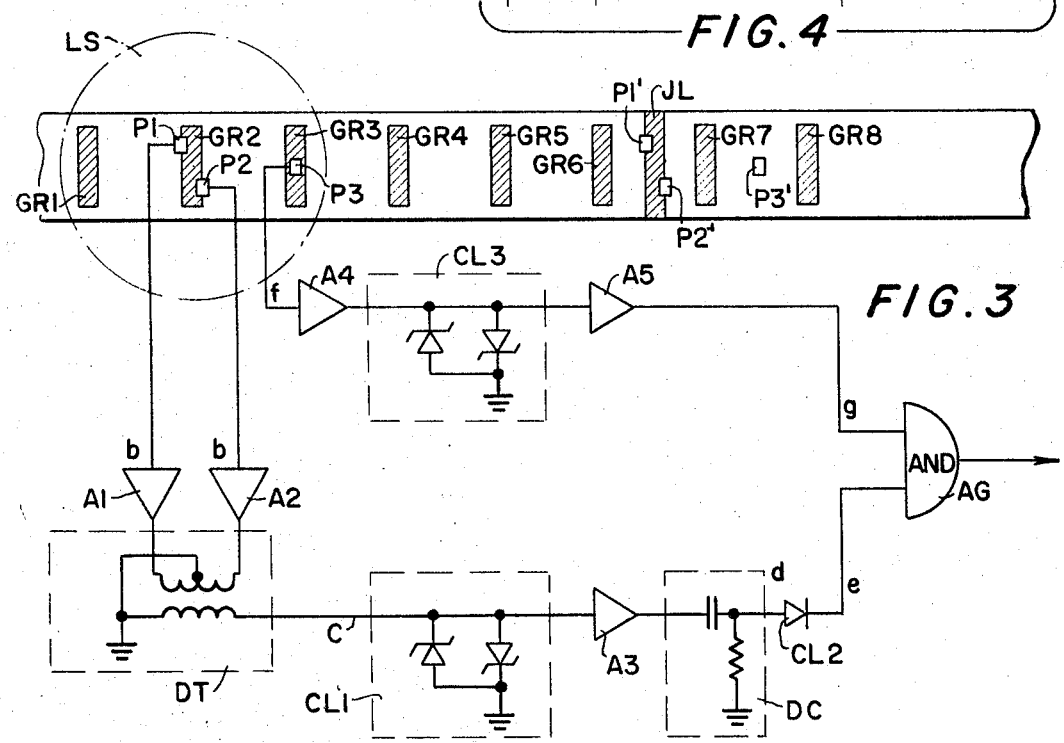

United States Patent Office 3,453,051
Patented July 1, 1969

3,453,051
OPTICAL SCALE-LINE DETECTING SYSTEM
Kazuto Togino, Tokyo, Japan, assignor to Fujitsu Limited, Kawasaki, Japan, a corporation of Japan
Filed Feb. 12, 1964, Ser. No. 344,376
Claims priority, application Japan, Feb. 15, 1963, 38/8,023
Int. Cl. G01b *11/04;* G01d *5/34;* H01j *3/14*
U.S. Cl. 356—170                                     1 Claim

ABSTRACT OF THE DISCLOSURE

A first photoelectric device detects each spaced graduation of a graduated scale one at a time. A second photoelectric device detects each graduation one at a time and is spaced from the first photoelectric device a distance such that two spaced graduations are detected simultaneously. A circuit connected to the first and second photoelectric device senses the response of the first and second photoelectric devices to produce an output signal only when both the first and second photoelectric devices detect graduations simultaneously. The circuit produces no output signal when the photoelectric devices detect a disturbance in the scale which is not coincident with a graduation thereof.

---

My invention relates to devices for detecting graduations on a scale, and particularly to systems which control the movement of a work table on automatic machine tools by optically sensing the graduation on a stationary linear scale and producing an output each time a reference axis on the table passes that graduation.

Such automatic machine tools and systems are described in Patent No. 3,323,030 filed Dec. 23, 1963 and assigned to the assignee of this application.

Linear scales for this purpose, generally having 1 mm. graduations are usually manufactured in lengths no longer than 1.5 to 2 meters. When longer lengths are required, it is necessary to join individual scales. This causes visible joints which may be erroneously detected as graduations by optical detecting systems. Moreover, such scales are liable to receive visible scratches which would also be detected and thus produce undesirable errors. In general, devices for optically sensing graduations have not been able to discriminate between such spurious visible effects and the graduations.

It is an object of my invention to provide an optical system for sensing graduations on a scale as a predetermined reference axis passes the graduations, and which is capable of discriminating between the graduations to be sensed and spurious visible irregularities.

According to a feature of my invention, I detect the graduations by focusing them on photoelectric means which are located to sense each graduation only when the graduation passes the reference axis, and focusing them on second photoelectric means which are displaced from the first photoelectric means at a distance at which it will simultaneously sense another graduation when the first graduation passes the reference axis.

Other objects and advantages of the invention will become obvious from the following detailed description illustrating an embodiment of the invention when read in light of the following drawing. However, it will be obvious to those skilled in the art that the invention may be otherwise embodied within its spirit and scope. In the drawing:

FIG. 1 is an elevation, partially in perspective of a machine tool utilizing the reading system according to the invention;

FIG. 2 is a schematic view of a portion of the optical system of the machine tool of FIG. 1;

FIG. 3 is a schematic view of the scale in FIG. 1 as it is focused upon the optical device of FIG. 2, together with the circuit connected to the optical device; and FIG. 4 is a series of curves illustrating voltages at various points in the circuit of FIG. 3.

In FIG. 1 a machine tool includes a bed BD upon which a work table WT is longitudinally movable by means of a feed motor FM operating through a feed screw FS. Mounted on the bed BD is a measuring scale SC having a plurality of graduations or scale lines separated by appropriate distances, such as 1 mm. An optical system OS is mounted on the work table WT for travel therewith and includes a lens system LS for focusing the graduations upon a photo system PS within the optical system as the optical system moves with the work table. The position of the work table WT may be controlled by automatic means operating from the output of the photo system. Such means are disclosed in the above-mentioned copending applications.

FIG. 2 illustrates the photo system PS of FIG. 1. Included therein is a photo element P1 on one side of a reference axis AX, corresponding to the machine tool reference axis, and a photo element P2 on the other side of the axis AX. The axes of the photo elements P1 and P2 are separated longitudinally from each other by a distance D1 which corresponds to the width of the graduations in FIG. 1 when they are magnified by the lens system LS upon the photo system PS. A photo element P3 has its center line separated from the axis AX in the longitudinal direction a distance corresponding to the center line separation between the graduations when these are magnified by the lens system LS upon the photo system PS.

FIG. 3 is a view of graduations GR1, GR2, GR3, GR4, GR5, GR6, GR7 and GR8 of the scale SC as it would appear when magnified onto the photo system PS. The scale SC comprises two portions joined by a joint line JL. It is this joint line whose detection the photo system should avoid to prevent error. In FIG. 3 the optical system OS has moved the photo system PS so that the photo element P1 has its center line coinciding with the left edge of the graduation GR2 and the photo element P2 has its center axis coinciding with the magnified image of the right edge of the graduation GR2. Under these conditions, the magnified image of the graduation GR3 has its center line coinciding with the center line of the photo element P3.

The output of elements P1 and P2 connect through amplifiers A1 and A2 to the opposite inputs of a differential transformer DT. The output thereof is clipped with a clipper CL1. An amplifier A3 passes the clipped output signal to a differentiating circuit DC whose output passes through a second clipper CL2 and into one input of AND-gate AG. An amplifier A4 passes the output of the photo element P3 through a clipper CL3 to an amplifier A5 passing the clipped signal to a second input in the AND-gate AG.

In operation, the feed screw FS drives the work table WT and the optical system OS over the scale SC so that an image of the scale SC passes by the photo elements P1, P2 and P3. In FIG. 3 as elements P1 and P2 successively pass over the images of graduation GR2 they produce successive pulses whose peaks occur respectively before and after the reference axis passes the graduation center. Amplifiers A1 and A2 amplify these signals and pass them to the differential transformer DT which then produces a positive-then-negative going double-pulse whose change-over point coincides with the passage of the reference axis AX over the graduation center. This double-pulse is then amplified, clipped, and differentiated to produce two sharp negative spikes, corresponding to the start and end of the double-pulse, and a positive center spike corresponding to the change-over point, and hence the time of coincidence between the reference axis and the graduation center. The clipper CL2 passes only this last center spike to the AND-gate AG.

Simultaneously the photo element P3, passing over the graduation GR3, produces a pulse which when amplified and clipped is applied to AND-gate AG at the same time as the spike at the other input. This coincidence occurs because the distance D2 corresponds to the magnified distance between the graduations.

As long as the spacing D2 between the center line AX and P3 corresponds to an integral multiple of the distance between the graduation, the input to the AND-gates will occur simultaneously, and thus produce an output when a graduation is sensed.

This operation is shown in FIG. 4. Here in curves *a* through *g*, the abcissas measure distance along the image of the scale SC. In curves *a* through *e*, the vertical lines *y* represent the locations of the magnified edges of graduation GR2. Curve *a* represents the voltage output of any photo element as its center line passes longitudinally over the graduation image. Curve *b* represents the outputs of the elements P1 and P2 respectively as the center axis AX of the photo system PS passes over the image of the same graduation, to produce thereby two successive pulses. Curve *c* represents the output of the differential transformer DT as the axis AX executes the motion in curve *b* past the image of the graduation GR2. Curve *d* represents this output after it has been clipped, amplified and differentiated at the differentiating circuit DC. Curve *e* shows the remaining pulse applied to the AND-gate after clipper CL2 has removed the negative going pulses therefrom. Curve *f* shows the output of the photo element P3 as the axis AX passes the graduation GR2, causing the photo element P3 to pass the image of graduation GR3. Curve *g* represents the same curve after it has been clipped and amplified as it is applied to the AND-gate AG.

If the optical system and its photo system have moved to the position on the scale image indicated by the photo elements P1', P2' straddling the edges of the joint line JL, an output would occur only in elements P1 and P2. However, according to the invention, no output would appear in the photo element P3. Lack of this output would prevent a second input *g* in the AND-gate AG and no output would be produced. As a result, errors due to sensing of scratches and joint lines are reliably avoided.

The disclosed embodiment shows the graduations to be equally spaced from each other. However, the invention may be applicable even if the graduations are not equal. For example, if the graduations are divided into equally spaced consecutive groups, each group being equal and having logarithmically spaced graduations (as in the A-scale of a slide rule), the distance D2 need merely extend from the first graduation in one group to the first graduation in the next group.

I claim:

1. A device for reading a graduated longitudinal scale having a plurality of spaced graduations along the length thereof, which reading is not affected by a mark in said scale which is not part of said spaced graduations, comprising first photoelectric means for detecting each graduation one at a time and including two photoelectric elements spaced transverse to said longitudinal scale to detect opposite edges of one graduation simultaneously, second photoelectric means for detecting each graduation one at a time and spaced from said first photoelectric means a distance along the length of said longitudinal scale for detecting a spaced second graduation when the elements detect the edges of a first graduation, and circuit means connected to said first and second photoelectric means for sensing the response of said first and second photoelectric means to produce an output signal only when the two elements of said first photoelectric means and said second photoelectric means simultaneously detect graduations and producing no output signal when detecting a disturbance in said scale which is not coincident with a graduation of said scale, said circuit means including a differential amplifier having input leads each connected to an output of said photoelectric elements, first clipper means for clipping the output of said differential transformer, differentiating means for differentiating the output of said first clipper means, second clipper means connected to the output of said differentiating means for producing a pulse going only in one direction, third clipper means for clipping the output of said second photoelectric means and an AND-gate connected to the outputs of said second and third clipper means for detecting whether the output of said second clipper means and said third clipper means occur simultaneously.

References Cited

UNITED STATES PATENTS 3,122,237 2/1964 Stenstrom.
3,316,411 4/1967 Linderman.

RONALD I. WIBERT, *Primary Examiner.*

T. R. MOHR, *Assistant Examiner.*

U.S. Cl. X.R.
250—231, 237